United States Patent
Chen

(10) Patent No.: US 7,568,450 B2
(45) Date of Patent: Aug. 4, 2009

(54) PET STROLLER HAVING A PORTABLE PET CARRIER

(75) Inventor: Shun-Min Chen, Taipei (TW)

(73) Assignee: Wonderland Nurserygoods Co. Ltd., Taipei (TW)

( * ) Notice: Subject to any disclaimer, the term of this patent is extended or adjusted under 35 U.S.C. 154(b) by 358 days.

(21) Appl. No.: 11/411,126

(22) Filed: Apr. 26, 2006

(65) Prior Publication Data

US 2006/0284392 A1    Dec. 21, 2006

(30) Foreign Application Priority Data

Jun. 21, 2005    (CN) .................... 2005 2 0109129 U

(51) Int. Cl.
*A01K 1/03* (2006.01)
(52) U.S. Cl. ...................... 119/496; 119/453
(58) Field of Classification Search ................ 119/482, 119/496, 497, 498, 499, 500, 501, 452, 453, 119/454, 474; D30/108, 109; D12/129; 280/642, 643, 644, 657, 658, 650, 47.38, 280/47.41, 47.17
See application file for complete search history.

(56) References Cited

U.S. PATENT DOCUMENTS

| D453,593 S | * | 2/2002 | Licciardello | ............... D30/109 |
| 6,374,775 B1 | * | 4/2002 | Baumsteiger | ............... 119/496 |
| D475,660 S | * | 6/2003 | Licciardello | ............... D12/129 |
| 6,584,937 B1 | * | 7/2003 | Ludolph | ..................... 119/453 |
| 7,090,242 B1 | * | 8/2006 | Sheinall et al. | ............. 280/657 |
| 7,152,554 B2 | * | 12/2006 | Crawford | ..................... 119/496 |
| 2001/0013689 A1 | * | 8/2001 | Cone et al. | ............... 280/47.41 |
| 2004/0065270 A1 | * | 4/2004 | King | ........................... 119/496 |
| 2004/0124610 A1 | * | 7/2004 | Hou et al. | ................... 280/642 |

* cited by examiner

Primary Examiner—T. Nguyen
(74) Attorney, Agent, or Firm—Bacon & Thomas, PLLC

(57) ABSTRACT

A pet stroller includes a pet carrier having a base and an engaging portion formed on the base and a stroller body having two landing tubes configured to support the pet carrier and two holding portions connected with the landing tubes. The engaging portion of the pet carrier being selectively engaging and disengaging with the holding portions of the stroller body to enable the pet carrier to be detachably attached to the stroller body. In addition, the pet stroller further includes a controlling assembly for removing the pet carrier from the stroller easily and quickly and fastening the soleplate on the holding portions.

7 Claims, 7 Drawing Sheets

PET STROLLER HAVING A PORTABLE PET CARRIER

BACKGROUND OF THE INVENTION

1. Field of the Invention

This present invention relates generally to a pet stroller, and more particularly to a pet stroller having a pet carrier.

2. Art Background

In general, a pet stroller at least includes a stroller body and a pet carrier, in which the pet carrier is configured for placing pets and is transported by the stroller body. In related prior arts, the pet carrier and the stroller body are usually designed to combine with each other and to dispose the pet carrier on a plate of the pet stroller directly, or to use webbing, fastener or any other suitable article to fasten the pet carrier on the stroller body and to prevent the pet carrier from loosing when the pet stroller is moving. However, the pet stroller according to the prior art has a shortcoming in that the combination of the pet carrier and the stroller body is unstable, and thus it may endanger the safety of the pets when being transported in a rough road or being subjected to an emergency.

In order to overcome the problems described above, it provides a pet stroller having a pet carrier according to one embodiment of the present invention, in which the pet carrier can be securely disposed on the stroller body and such a pet stroller allows a user to remove the pet carrier from the pet stroller easily and quickly, as a pet carrier for a user.

SUMMARY OF THE INVENTION

Accordingly, one object of the present invention is to provide a pet stroller having a pet carrier, in which the pet carrier is capable of being detachably combined with a stroller body.

Another object of the present invention is to provide a pet stroller having a pet carrier, in which the pet carrier can be removed quickly and easily from a stroller body for a user to carry with him/her.

A further object of the present invention is to provide a pet carrier capable of combining with a stroller body securely and removing from the stroller body conveniently, and the detached pet carrier can be portable.

Still another object of the present invention is to provide a stroller body that is detachably combined with a pet carrier for transporting the pet carrier conveniently.

To achieve these and other objects, a pet stroller is provided, and the pet stroller includes a pet carrier having a base and an engaging portion formed on the base; and a stroller body having two landing tubes configured to support the pet carrier and two holding portions connected with the landing tubes, wherein the engaging portion of the pet carrier been selectively engaging and disengaging with the holding portions of the stroller body therefrom to enable the pet carrier to be detachably attached to the stroller body.

It is preferred that the engaging portion includes two troughs, and the holding portions are in a form of protrusion for being engaged with the troughs of the base.

It is preferred that the pet carrier further includes a wire connected with the base and a covering cloth configured to enclose the wire and supported on the base with the wire.

It is preferred that the holding portions further include two recesses disposed in the inner side of the holding portions, and the base further includes a controlling assembly having an adjusting wire, wherein the two ends of the adjusting wire are inserted into the two recesses for fastening the base on the holding portions.

It is preferred that the holding portions further include two inclined bumps disposed in the inner side of the holding portions for assisting the combination of the adjusting wire and the recesses.

It is preferred that the controlling assembly further includes a button with a slot, and each slot has a cam surface for moving the adjusting wire.

It is preferred that the back of the button further includes a spring for biasing the button.

It is preferred that the base further includes two knobs disposed in the proximity of the engaging portion, wherein the adjusting wire moves along the cam surface toward the front side of the base when pressing the button for removing the pet carrier from the stroller body and then the adjusting wire extrudes the knobs mutually for making the adjusting wire move along the inner side of the base so as to make the adjusting wire exit from the recesses of the holding portions, whereby making the pet carrier be detached from the pet stroller.

It is preferred that the base further includes two guiding members disposed in the proximity of the engaging portion and positioned between the engaging portion and the knobs, and each of the guiding members includes a guiding opening for making the adjusting wire pass therethrough so as to guide the movement of the adjusting wire.

According to another preferred embodiment of the present invention, a pet carrier capable of being detachably attached to a stroller body is provided. The pet carrier includes a base having an engaging portion for selectively engaging and disengaging with the stroller body, and the pet carrier is allowed to be transported by the stroller body or to be portable while removing from the stroller body.

It is preferred that the pet carrier further includes a covering cloth and a wire, the wire is substantially U-shaped, and the base further includes a plurality of holes disposed in the corners of the base, wherein the wire is connected with the covering cloth and inserted into the plurality of holes for supporting the covering cloth on the base.

It is preferred that the stroller body further includes two holding portions with two recesses, and the two recesses are disposed in the inner side of the holding portions.

It is preferred that the base of the pet carrier further includes a controlling assembly with an adjusting wire, wherein the two ends of the adjusting wire are inserted into the two recesses for fastening the base on the holding portions.

It is preferred that the controlling assembly further includes a button for urging the adjusting wire to relieve the fastening condition and removing the pet carrier from the stroller body.

It is preferred that the pet carrier further includes a fixing member disposed on the bottom of the covering cloth and a fixing buckle disposed on the base, and the base further includes a opening, wherein the fixing member is connected with the fixing buckle while passing through the opening for fastening the covering cloth on the base.

It is preferred that the pet carrier further includes a tote bag and two side-bags disposed in the sides of the pet carrier for putting desired pet-related articles to a user.

It is preferred that the pet carrier further includes a dormer, a dormer cover and a fixing member, wherein the dormer and the dormer cover selectively moved between two positions and secured in each position by the fixing member.

According to yet another preferred embodiment of the present invention, a stroller body capable of transporting a pet carrier having an engaging portion is provided. The stroller body includes a pair of landing tubes configured to support the pet carrier and a pair of holding portions mounted on the landing tubes, and the pet carrier is allowed to be detachably attached to the stroller body by selectively engaging the holding portions with the engaging portion.

It is preferred that the holding portions is in a form of protrusion and includes an upper portion and a lower portion, wherein the lower portion is fixed to the landing tube and the upper portion is capable of being engaged with a trough of the pet carrier.

It is preferred that the holding portions further include a recess for being engaged with a controlling assembly of the pet carrier.

It is preferred that the stroller further includes two front frames connected with one end of the landing tube and two rear frames connected with the other end of the landing tube, and each one ends of the front frames and the rear frames are connected with a wheel respectively.

It is preferred that the landing tube further includes a basket tube for hanging a basket, the two ends of the basket tube being connected with the landing tube, and the rear end of the basket tube being pivotally connected with the rear frame.

It is to be understood that both the forgoing general description and the following detailed description are exemplary and explanatory and are intended to provide a further non-limiting explanation of the invention as claimed.

BRIEF DESCRIPTION OF THE DRAWINGS

For a more complete understanding of the present invention and the advantages thereof, reference is now made to the following description taken in conjunction with the accompanying drawings, wherein.

DETAILED DESCRIPTION

Figure 1A:
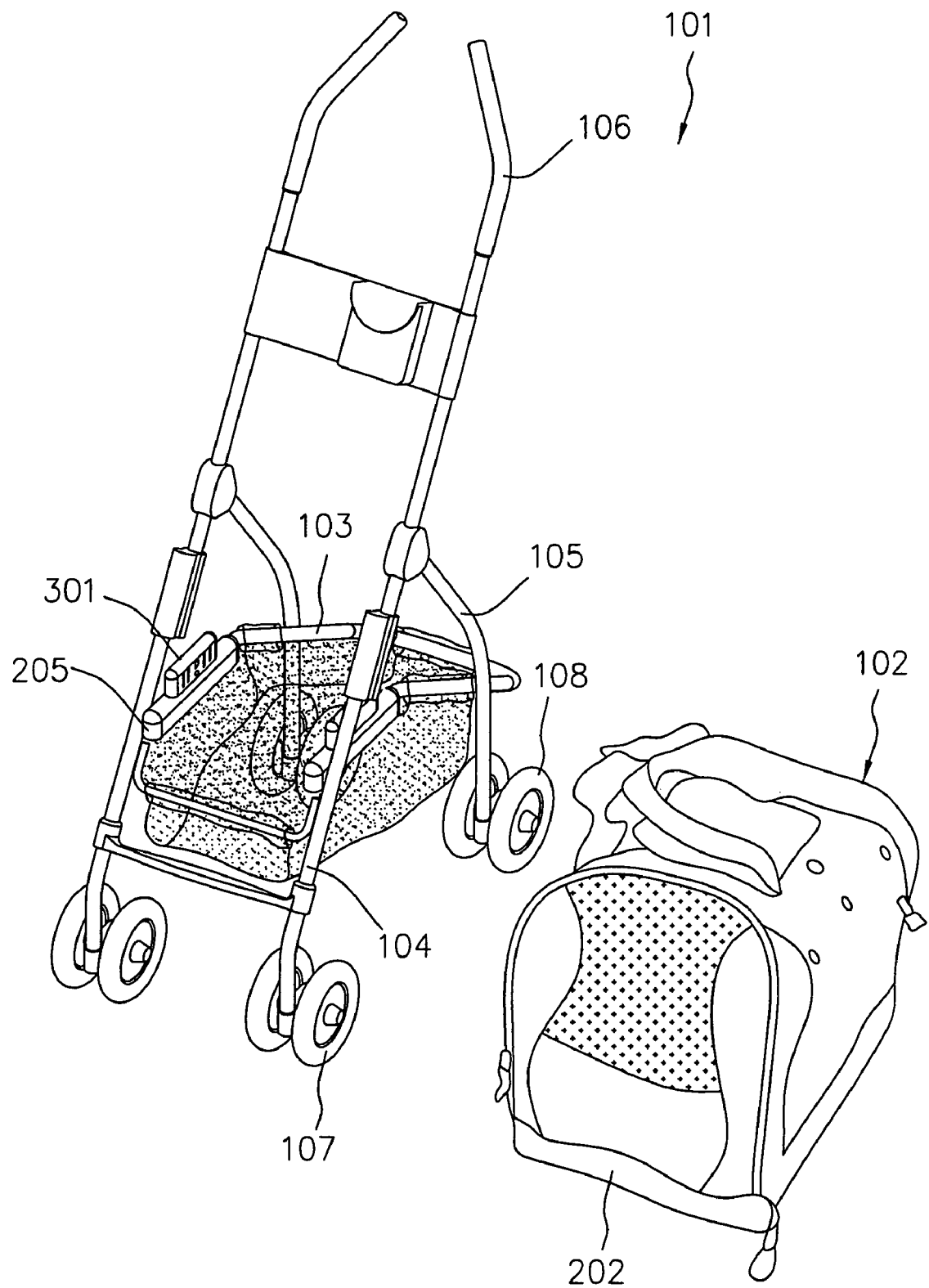
FIG. 1A is a schematic view illustrating the entire appearance of the pet stroller according to an embodiment of the present invention.

Referring now to the drawings in which an embodiment of the present invention is illustrated to describe the present invention.

Figure 1B:
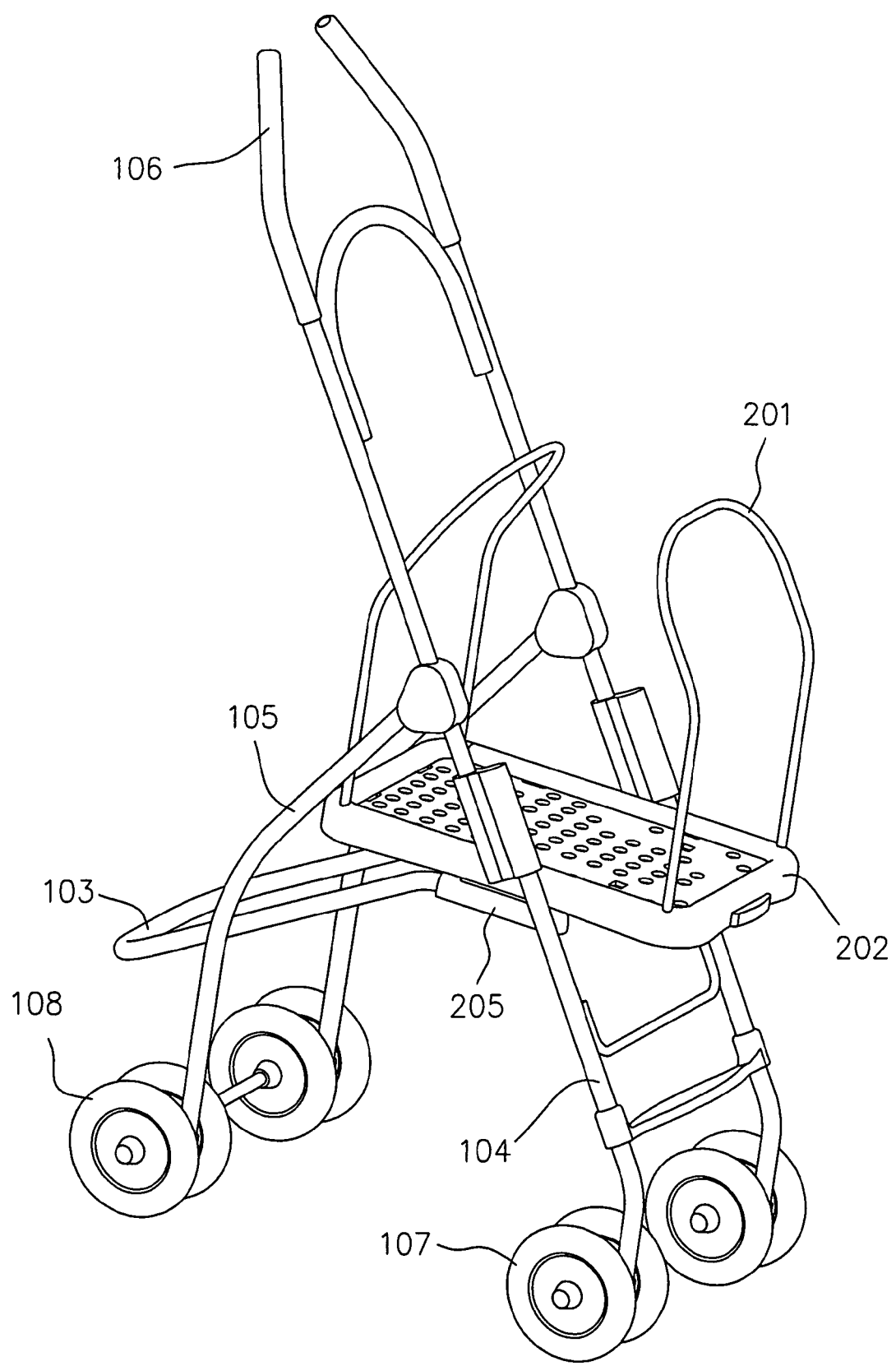
FIG. 1B is a schematic view illustrating the partly sectional view of the stroller body after combining with the pet carrier.

First, the entire appearance of the pet stroller and its structure according to an embodiment of the present invention will be set forth in the description. As shown in FIG. 1A, the pet stroller mainly includes a stroller body 101 and a pet carrier 102, wherein the pet carrier 102 can be combined with the stroller body 101 securely and the combination thereof is shown in FIG. 1B, and the combination method thereof will be described in the following. In addition, the pet carrier 102 can be attached to the stroller body 101 conveniently and removed from the stroller body 101 easily and quickly for a user to carry. The structures of the stroller body 101 and the pet carrier 102 will be set forth in the following description.

The Main Structure of the Stroller Body

Figure 3:
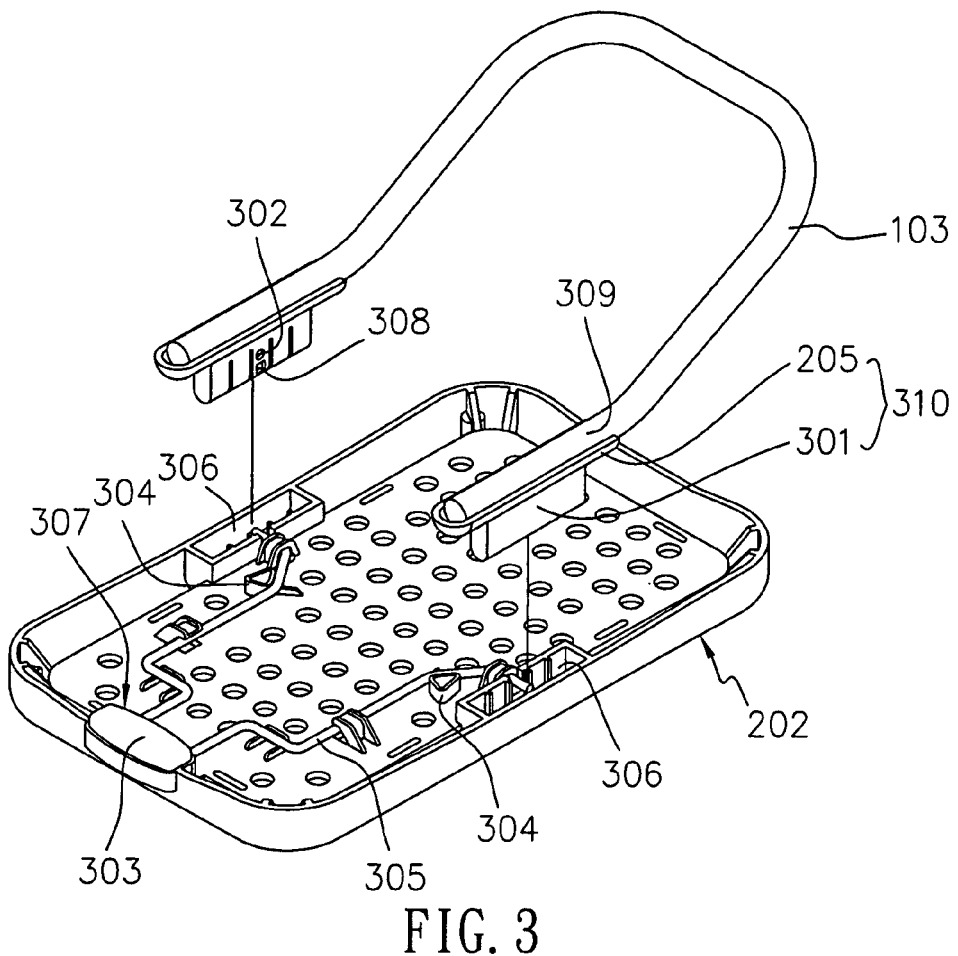
FIG. 3 is a bottom view illustrating the structures of the stroller body and the base in detail.

As shown in FIGS. 1A, 1B and FIG. 3, the stroller body 101 includes two front frames 104 (at two opposite side), two rear frames 105 (at two opposite side), a basket tube 103, two handles 106 (at two opposite side), two front wheels 107 (at two opposite side), two rear wheels 108 (at two opposite side), two landing tubes 309 (as shown in FIG. 3) and two holding portions 310 (as shown in FIG. 3), wherein the basket tube 103 is pivotally connected with the two rear frames 105, each of the landing tubes 309 is pivotally connected with the front frame 104, and the basket tube 103 is substantially U-shaped and each two end of the basket tube 103 is respectively connected with the landing tube 309, whereas the rear end of the basket tube 103 is pivotally connected with each of the two rear frames 105, and the basket tube 103 is configured to hang a basket thereon. Furthermore, each one end of the two front frames 104 and the two rear frames 105 is connected with a front wheel 107 and a rear wheel 108 respectively, and the other ends of the two front frames 104 are connected with the two handles 106, the handles 106 are configured to move the pet stroller for users. Besides, in order to minimize the bulk thereof, a user can operate a conventional folding mechanism to collapse the stroller body 101. It should be appreciated that, in this embodiment, the basket tube 103 and the landing tube 309 are integrated. The present invention mainly lays stress on the mechanism design of combination between the stroller body 101 and pet carrier 102 and the operation method thereof.

Next, as illustrated in FIGS. 1B and 3, the landing tube 309 is connected with the holding portions 310 and then the holding portions 310 is engaged with the pet carrier 102 for supporting the pet carrier 102, each of the holding portion 310 is in a form of protrusion, and the holding portion 310 includes a lower holding portion 205 and an upper holding portion 301, wherein the lower holding portions 205 is fixed to the landing tube 309, and a recess 302 and an inclined bump 308 are disposed in the inner side of the upper holding portions 301 and proximate with the lower holding portions 205.

The Main Structure of the Pet Carrier

Figure 2:
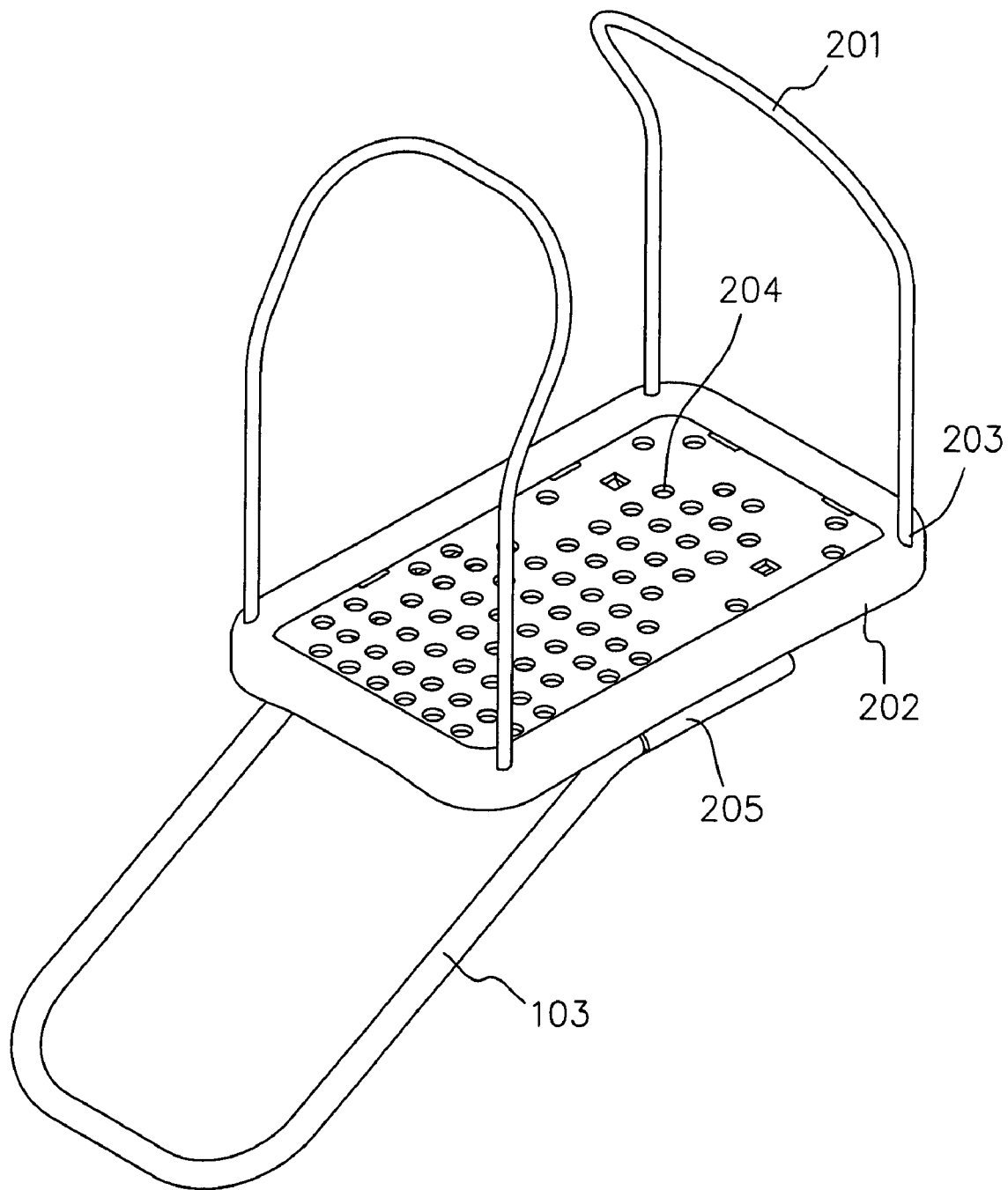
FIG. 2 is a schematic view illustrating the partly sectional view of the pet carrier.

As shown in FIG. 2, the pet carrier 102 includes a base 202, a pair of wires 201 that are substantially U-shaped, and a covering cloth 701 (shown in FIG. 7A), wherein the base 202 includes a plurality of holes 203 disposed in the four corners of the base 202 and a plurality of vent holes 204, the wires 201 are directly inserted into the corresponding holes 203 of the base 202 for fastening the wires 201 on the base 202; whereas the vent holes 204 are configured to provide an adequate ventilation between the pets and the external environment for preventing from making the pets feel uncomfortable. It should be appreciated that the base 202 is a soleplate in this embodiment according to the present invention. Next, as shown in FIG. 3, which is a bottom view for illustrating the structures of the stroller body 101 and the base 202 in details, the base 202 includes a controlling assembly 307, two knobs 304 (at two opposite side), two troughs 306 (at two opposite side) and two guiding members 501 (shown in FIG. 5B), wherein each of the knobs 304 and each of the guiding members 501 are respectively disposed in the proximity of each of the troughs 306, and each of the guiding members 501 is disposed between the troughs 306 and the knobs 304.

Figure 4:
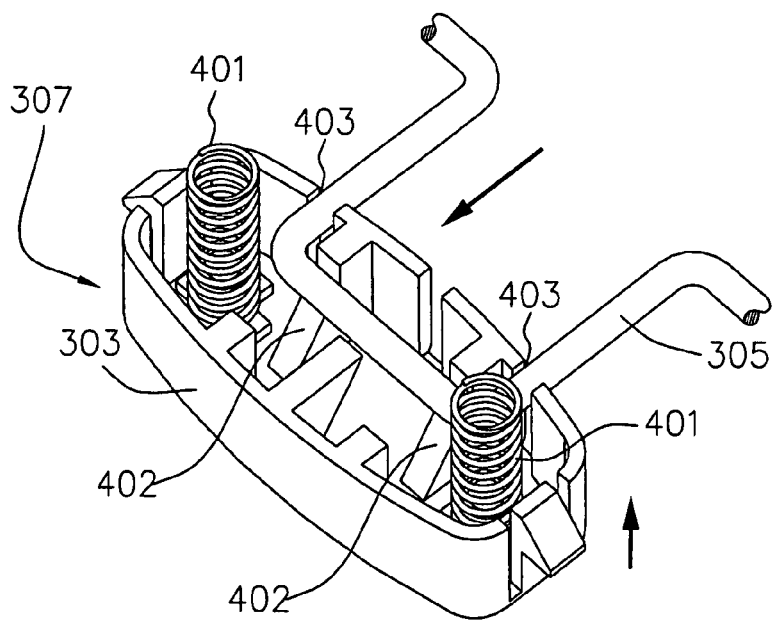
FIG. 4 is a bottom view of the controlling assembly.

Further, as shown in FIG. 4, which is a bottom view of the controlling assembly 307, the controlling assembly 307 includes a button 303, an adjusting wire 305 and two springs 401 (as shown in FIG. 4), wherein the back of the button 303 includes two slots 402 and two troughs 403 (as shown in FIG. 4), and the adjusting wire 305 passes through the troughs 403 of the button 303 and makes the front-end U-shaped portion of the adjusting wire 305 be disposed on the troughs 403 for connecting the adjusting wire 305 with the button 303. It should be appreciated that the front end of the adjusting wire 305 is substantially U-shaped in this embodiment according to the present invention. In addition, each of the slots 402 includes a cam surface for moving the adjusting wire 305, and the springs 401 are configured to bias the button 303 when pressing the button 303.

Further, each of the guiding members 501 includes a guiding opening for making the adjusting wire 305 pass therethrough so as to guide the movement of the adjusting wire 305. The adjusting wire 305 is abutted the knobs 304 and the two ends of the adjusting wire 305 are inserted into the troughs 306 of the base 202.

The Combination of the Stroller Body and the Pet Carrier

The combination of the stroller body 101 and the base 202 of the pet carrier 102 will be set forth in the following. As shown in FIG. 3, each of the holding portions 310 of the stroller body 101 is in a form of protrusion, wherein the upper holding portion 301 of the holding portions 310 is configured for being engaged with the troughs 306 of the base 202. When a user puts the pet carrier 102 in the stroller body 101, the adjusting wire 305 passes through the inclined bump 308 and then is inserted into the recess 302 of the upper portion 301 for making a combination between the upper portion 301 and the trough 306 of the base 202 and engaging the pet carrier 102 with the stroller body 101. Further, the two ends of the adjusting wire 305 are capable of inserting into the recess 302 of the upper portion 301 to prevent from shaking of the base 202 when transporting the pet stroller. In particular, the pet stroller according to the present invention provides a controlling assembly design, which mainly increases the safety of the combination between the holding portions 310 and the base 202 and removes the base 202 therefrom more easily and quickly.

Figure 5A:
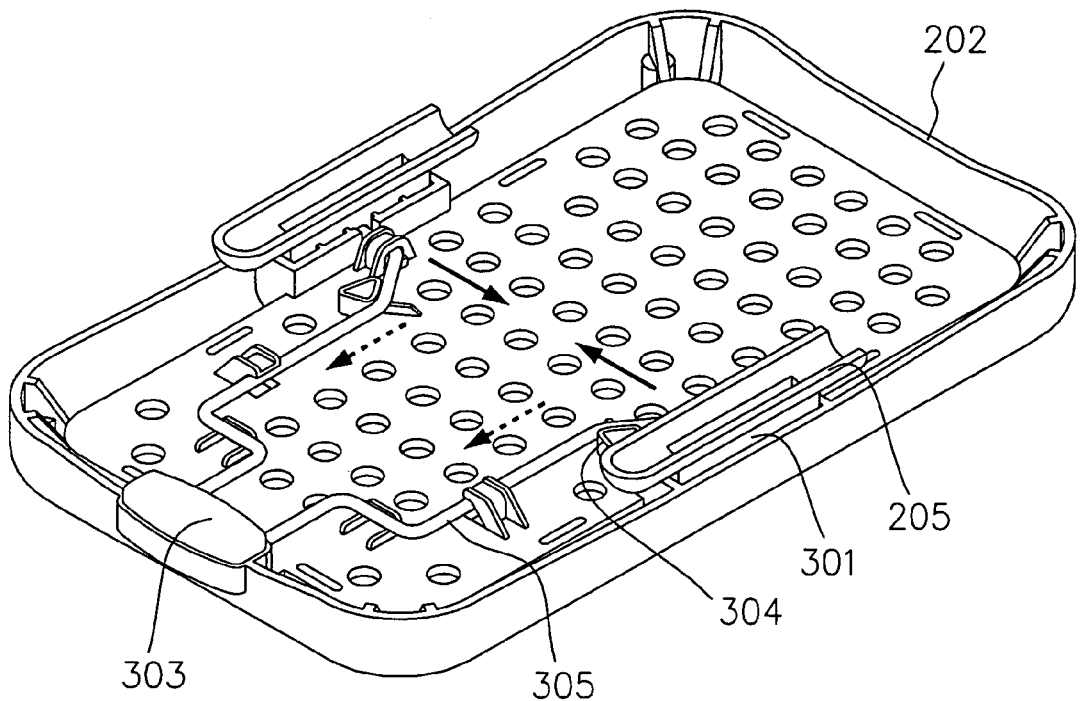
FIG. 5A is a schematic view illustrating the combination of the base of the pet carrier and the holding plate of the stroller body.
Figure 5B:
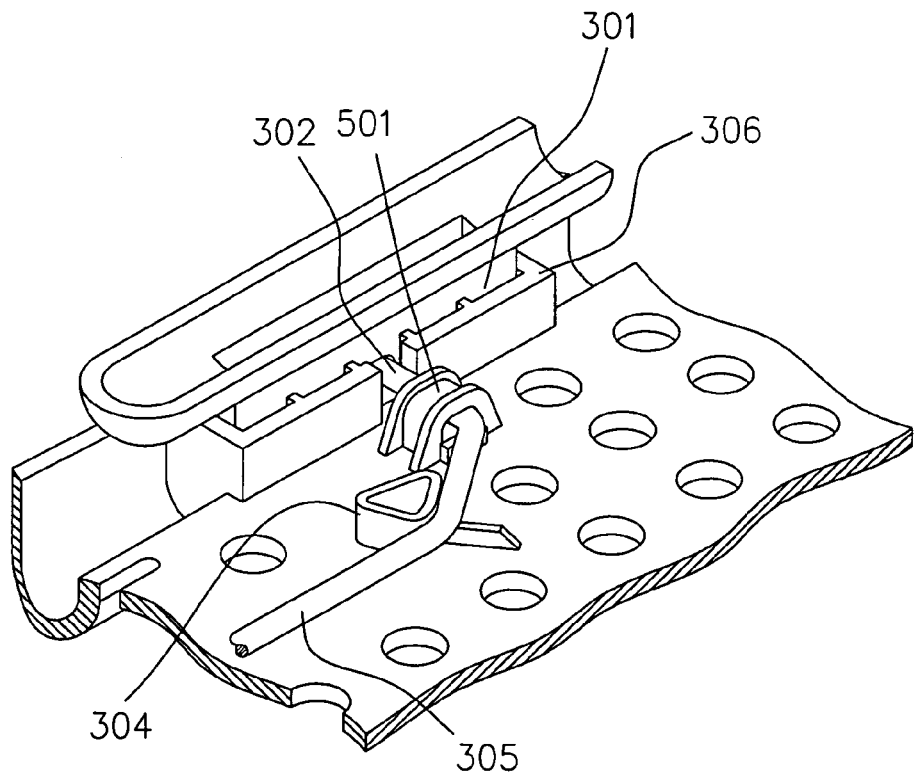
FIG. 5B is a partial diagram illustrating the fastening between the adjusting wire and the recesses.

The operation of the controlling assembly 307 will be set forth in the following accompanied with FIGS. 5A and 5B. As shown in FIGS. 5A and 5B, the adjusting wire 305 moves along the cam surface of the slots 402 toward the front side of the base 202 (shown in the direction of dotted-line arrow of FIG. 5A) when pressing the button 303 for removing the pet carrier 102 from the stroller body 101 and then the adjusting wire 305 extrudes the knobs 304 mutually for making the adjusting wire 305 move along the inner side of the base 202 (shown in the direction of solid-line arrow of FIG. 5A) so as to make the adjusting wire 305 exit from the recess 302 of the holding portions 310, whereby making the pet carrier 102 be detached from the stroller body 101 more quickly and easily.

The Combination of the Covering Cloth, the Wires and the Base

Figure 7A:
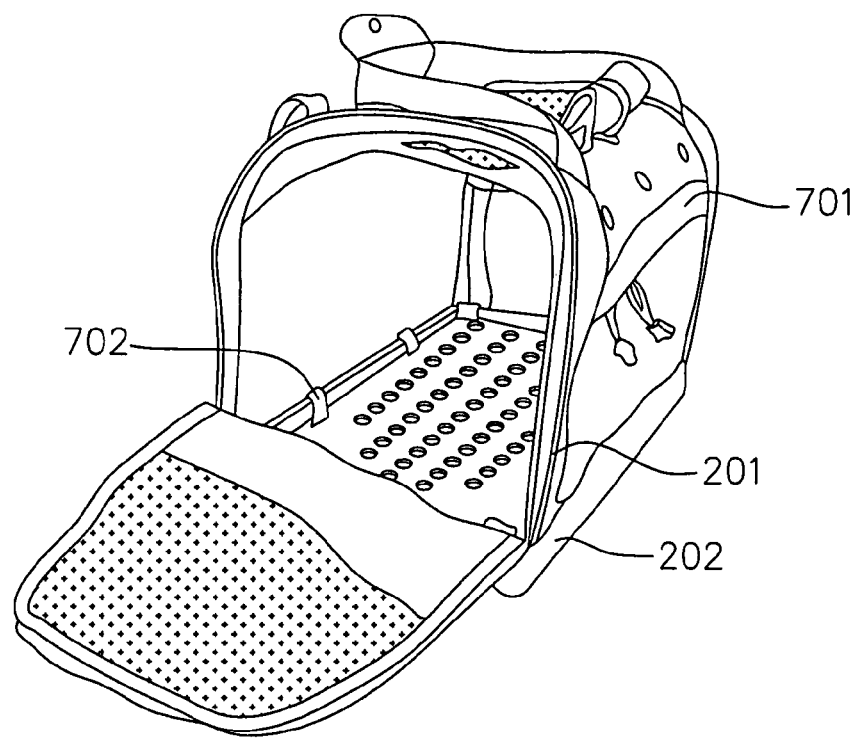
FIG. 7A is a schematic view illustrating the combination of the covering cloth, the wires and the base.
Figure 7B:
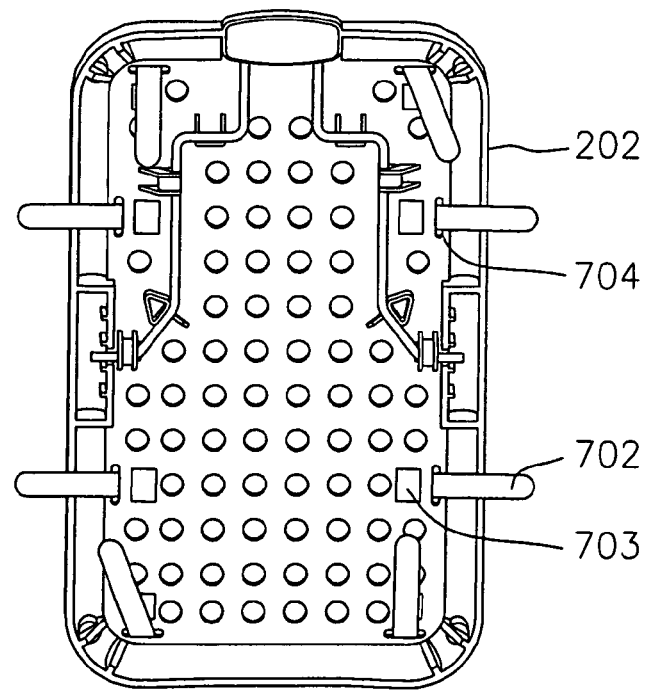
FIG. 7B is a bottom view of the pet carrier.

As shown in FIGS. 7A and 7B, in which FIG. 7A is a schematic view illustrating the combination of the covering cloth, the wires and the base and FIGS. 7A~7B describe fixing the covering cloth 701 to the base 202 securely by way of the fixing members 702 and the fixing buckles 703, whereas FIG. 7B is a bottom view of the pet carrier 102. The wires 201 pass through a lengthwise channel of the covering cloth 701 and then being fastened on the holes 203 for fastening the covering cloth 701 on the base 202, and the covering cloth 701 further includes an opening having a cover in its one side for allowing the entrance of the pets. In addition, a plurality of fixing members 702 are disposed in the bottom side of the covering cloth 701, and those fixing members 702 are attached to the covering cloth 701 by sewing machine or any other suitable method, and pass through the plurality of openings 704 of the base 202 for fixing them to the fixing buckles 703 attached on the base 202 whereby the covering cloth 701 enclosing the wires 201 and then being fastened on the base 202. It should be appreciated that the fixing members 702 and fixing buckles 703 are of hook-and-loop fastener in this embodiment according to the present invention.

Figure 6A:
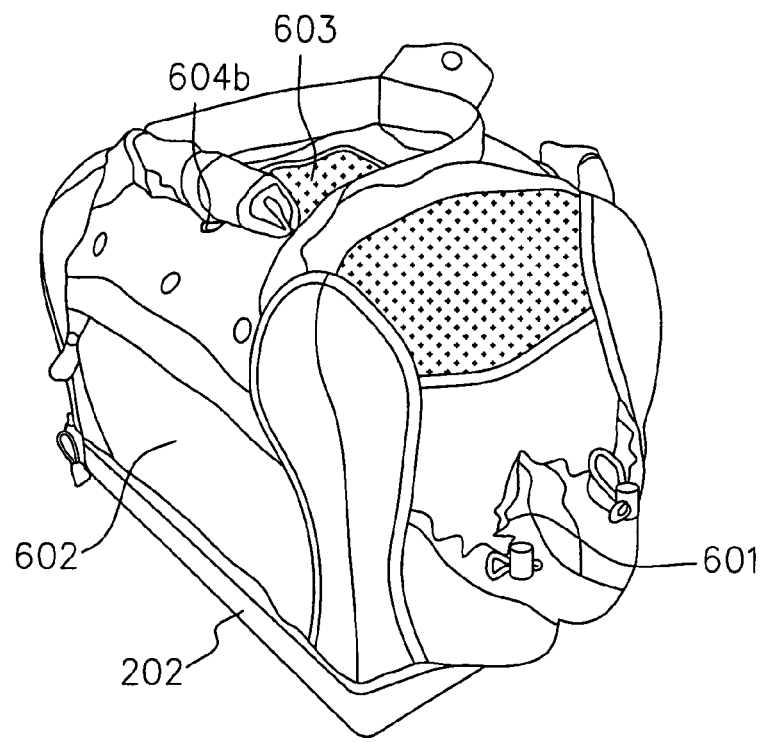
FIG. 6A is a schematic view illustrating the covering cloth in detail.
Figure 6B:
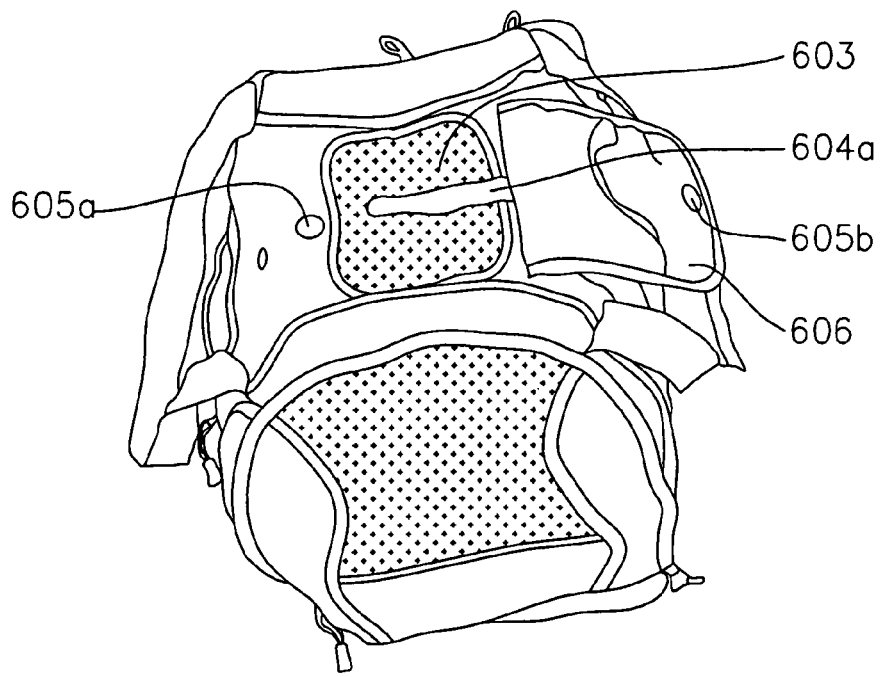
FIG. 6B is another schematic view illustrating the covering cloth in detail.

Next, as shown in FIGS. 6A and 6B, the description of the pet carrier 102 will be set forth in detail in the following. FIGS. 6A and 6B are the schematic views illustrating the members of the covering cloth 701 in detail, and the covering cloth 701 mainly includes tote bag 601, two side bags 602 (at two opposite side) and a dormer 603, wherein the tote bag 601 and the side bags 602 are configured to provide a space for putting desired pet-related articles or any other articles to a user. Further, the dormer 603 includes a plurality of meshes configured to make the pets contact with the external environment such as atmosphere and sunshine even if the pets are positioned in the pet carrier 102; besides, a user can watch the current condition of the pets with the meshes of the dormer 603. In addition, the dormer 603 is made up of transparent or semi-transparent materials (for instance) for assisting the user to watch the pet condition more clearly, which is not limited to the present invention. Next, FIG. 6B illustrates the functions for raising and closing the dormer 603 by way of the design of the fixing members and buckles. The dormer 603 further includes some fixing members (such as a fixing strap 604a, fixing buckles 604b, 605a, 605b in this embodiment according to the present invention) and a dormer cover 606, wherein the fixing buckles 605a and 605b are of hook-and-loop fastener, and both of them can be adhesive together with each other; besides, the fixing buckles 605b can be adhesive with the fixing strap 604a. One end of the dormer cover 606 is connected with the covering cloth 701, while the fixing buckle 605b in the other end of the dormer cover 606 is attached to the fixing buckle 605a. The dormer cover 606 is lifted and rolled up when a user intends to look inside of the pet carrier 102 from the dormer 603, and the dormer cover 606 can be fastened thereon for the adhesion between the fixing strap 604a and the fixing buckle 604b; besides, the dormer cover 606 is lay down when the user intends to close the dormer 603, and the dormer cover 606 can be lay on the dormer 603 for the adhesion between the fixing buckles 605a and 605b, and then the dormer 603 can be closed accordingly.

The above-described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

What is claimed is:

1. A pet stroller comprising:
   a pet carrier having a base and an engaging portion formed on said base; and
   a stroller body having two landing tubes configured to support said pet carrier and two holding portions connected with said landing tubes,
   wherein said engaging portion of said pet carrier is selectively engaged and disengaged with said holding portions of said stroller body to enable said pet carrier to be detachably attached to said stroller body, wherein said holding portions further comprise two recesses disposed in the inner side of the holding portions and said base further comprises a controlling assembly having an adjusting wire, two ends of the adjusting wire being inserted into the two recesses for fastening the base on the holding portions, wherein the holding portions further comprise two inclined bumps disposed in the inner side of the holding portions for assisting the combination of said adjusting wire and said recesses.

2. The pet stroller according to claim 1, wherein said engaging portion comprising two troughs, and said holding portions are in a form of protrusion for being engaged with said troughs of said base.

3. The pet stroller according to claim 1, wherein said pet carrier further comprising a wire connected with said base and a covering cloth configured to enclose said wire and supported on said base with said wire.

4. The pet stroller according to claim 1, wherein said controlling assembly further comprising a button with a slot, and each slot has a cam surface for moving said adjusting wire.

5. The pet stroller according to claim 4, wherein the back of said button further comprising a spring for biasing said button.

6. The pet stroller according to claim 4, wherein said base further comprising two knobs disposed in the proximity of said engaging portion, wherein said adjusting wire moves along said cam surface toward the front side of said base when pressing said button for removing said pet carrier from said stroller body and then said adjusting wire extrudes said knobs mutually for making said adjusting wire move along the inner side of said base so as to make said adjusting wire exit from said recesses of said holding portions, whereby making said pet carrier be detached from said pet stroller.

7. The pet stroller according to claim 6, wherein said base further comprising two guiding members disposed in the proximity of said engaging portion and positioned between said engaging portion and said knobs, and each of said guiding members comprising a guiding opening for making said adjusting wire pass therethrough so as to guide the movement of said adjusting wire.

* * * * *